(12) United States Patent  
Chan et al.

(10) Patent No.: US 9,360,935 B2  
(45) Date of Patent: Jun. 7, 2016

(54) INTEGRATED BI-SENSING OPTICAL STRUCTURE FOR HEAD MOUNTED DISPLAY

(71) Applicant: Hong Kong Applied Science and Technology Research Institute, Co. Ltd., New Territories (CN)

(72) Inventors: Kin Lung Chan, Kowloon (HK); Weiping Tang, Shenzhen (CN)

(73) Assignee: Hong Kong Applied Science and Technology Research Institute Co. Ltd., Shatin, New Territories (HK)

( * ) Notice: Subject to any disclaimer, the term of this patent is extended or adjusted under 35 U.S.C. 154(b) by 121 days.

(21) Appl. No.: 14/137,868

(22) Filed: Dec. 20, 2013

(65) Prior Publication Data

US 2015/0177831 A1   Jun. 25, 2015

(51) Int. Cl.
| | | |
|---|---|---|
| G02B 27/10 | (2006.01) | |
| G02B 27/14 | (2006.01) | |
| G06F 3/01 | (2006.01) | |
| G02B 27/01 | (2006.01) | |
| G06F 3/03 | (2006.01) | |
| G02B 27/00 | (2006.01) | |
| G02B 5/30 | (2006.01) | |

(52) U.S. Cl.
CPC ........ *G06F 3/013* (2013.01); *G02B 5/30* (2013.01); *G02B 27/0093* (2013.01); *G02B 27/017* (2013.01); *G02B 27/0172* (2013.01); *G06F 3/0321* (2013.01); *G02B 2027/0138* (2013.01); *G02B 2027/0187* (2013.01)

(58) Field of Classification Search
USPC .................................................. 359/618–634
See application file for complete search history.

(56) References Cited

U.S. PATENT DOCUMENTS

| | | | |
|---|---|---|---|
| 7,710,391 B2 | 5/2010 | Bell et al. | |
| 8,179,604 B1 | 5/2012 | Prada Gomez et al. | |
| 8,488,246 B2 | 7/2013 | Border et al. | |
| 2004/0201856 A1 | 10/2004 | Quadling et al. | |
| 2013/0208362 A1* | 8/2013 | Bohn et al. | 359/630 |
| 2013/0278631 A1* | 10/2013 | Border et al. | 345/633 |
| 2013/0322810 A1* | 12/2013 | Robbins | 385/11 |

* cited by examiner

*Primary Examiner* — Mohammed Hasan  
(74) *Attorney, Agent, or Firm* — Berkeley Law & Technology Group, LLP (57) ABSTRACT

A bi-sensing optical system capable of transmitting signals for eye and object tracking and/or detection, and/or capable of transmitting signals comprising visible light to an eye of a user and non-visible light for eye tracking and object detection and/or tracking is disclosed herein.

20 Claims, 5 Drawing Sheets

INTEGRATED BI-SENSING OPTICAL STRUCTURE FOR HEAD MOUNTED DISPLAY

FIELD

The subject matter disclosed herein relates generally to head mounted displays, and specifically, to bi-sensing optical structures for head mounted displays.

BACKGROUND

Head mounted displays (alternatively "HMD") are essentially head-mounted devices capable of displaying images, inter alia, on glasses lenses or screens oriented in front of a user's eyes, among other things. Some HMDs are non-see-through and do not, therefore, allow a user to view his or her surroundings. Other HMDs may allow full or partial views of the user's surroundings. For instance, GOOGLE GLASS® is one HMD device that resembles a pair of glasses with a computing device built directly into the frame, and includes an optical structure to direct visible light into the eye of a user to display a variety of information. HMD devices, such as GOOGLE GLASS®, may provide users with a wearable computing device capable of providing visible overlays while still allowing the user to view his or her surroundings. As designers push towards slimmer, smaller, and/or lighter HMD devices, the challenge of facilitating user interaction which can be both discreet (e.g., not requiring a user to speak commands, physically touch buttons and/or surfaces of HMD devices, and/or not providing information to users in audible forms, among other things) and accurate becomes more relevant. Additionally, making HMD devices that allow such functionality sufficiently small to be wearable presents challenges.

BRIEF DESCRIPTION OF THE DRAWINGS

Non-limiting and non-exhaustive embodiments will be described with reference to the following objects, wherein like reference numerals refer to like parts throughout the various objects unless otherwise specified.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Figure 1:
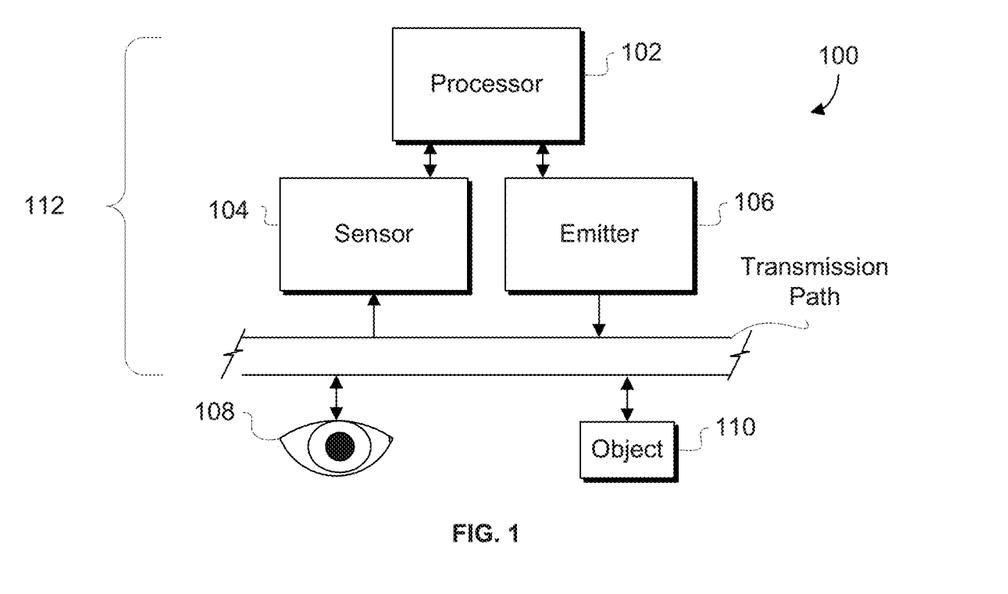
FIG. 1 is a block diagram illustrating a bi-sensing optical system according to one embodiment.

FIG. 1 is a block diagram of a bi-sensing optical system 100 according to one embodiment. The bi-sensing optical system 100 may comprise a bi-sensing optical device 112. Bi-sensing optical device 112 may comprise a processor 102, a sensor 104, and an emitter 106. Processor 102, sensor 104, and emitter 106 may be capable of sending and/or receiving signals. For instance, processor 102 may be capable of receiving electrical signals from other parts and/or modules of bi-sensing optical device 112 which may, for example, transmit electrical signals comprising, for instance, instructions for implementation by processor 102, among other things. Processor 102 may also transmit electrical signals to other parts and/or modules of bi-sensing optical device 112 such as, for example, sensor 104 and emitter 106, among other things. In one embodiment, sensor 104 and emitter 106 may be configured to send signals to and/or receive signals from a transmission path. For example, if the transmission path is an optical transmission path, sensor 104 and emitter 106 may be configured to receive optical signals from the transmission path and/or transmit optical signals to the signal path. In one case, the transmitted or received optical signals may comprise electromagnetic radiation of a given wavelength range such as, for example, visible light.

The transmission path may also be connected to or arranged in relation to a user's eye 108. In a case where signals on the transmission path comprise electromagnetic radiation having a range of wavelength spanning visible light, eye 108 may be able to receive the electromagnetic radiation in the retina of eye 108 to enable the user to view the electromagnetic radiation. Such transmission of visible light may allow a user to see, for example, a user interface overlay, an image, or other such visible representations of light. For example, the visible light may be configured such as to not inhibit a user's ability to also view his or her surroundings as shall be explained in greater detail hereafter. The signals on the transmission path may also comprise electromagnetic radiation having a range of wavelength outside of the range of visible light. For example, the signals may comprise electromagnetic radiation having a wavelength range spanning the range of infrared (IR) light. If the signals comprise IR light, the IR light may enable functionality such as, for example, eye tracking, among other things. For example, transmitted IR light may reflect off of structures of eye 108 and may travel through the transmission path and be sensed and/or captured by sensor 104, among other things. A transmission path capable of simultaneously supporting both visible and IR light and/or supporting both eye tracking and object detection/tracking may offer advantages including decreasing a size, weight, and complexity of a related system, lowering computation requirements by leveraging computations of one detection/tracking-related functionality (e.g., object detection) for another (e.g., eye tracking), and facilitating alignment and calibration, among other things. Of course, the foregoing is presented merely as an example of possible functionality supported by the present disclosure. As one of ordinary skill in the art would readily understand, this disclosure contemplates and covers other uses and functionality.

The transmission path may also be connected to or arranged in relation to an object 110. Object 110 may comprise a user's hand, a stylus, or any other object. The signals transmitted via the transmission path and in relation to object 110 may facilitate functionality such as, for example, object detection and/or tracking, among other things. For example, IR light may travel through the transmission path towards object 110. The transmitted IR light may reflect back off of object 110 and the reflected light may be sensed and/or captured by sensor 104, among other things.

As one of ordinary skill in the art would understand, emitter 106 may comprise any form of emitter capable of emitting electromagnetic radiation. Though represented by a single block, emitter 106 may comprise a plurality of individual emitters, each configured to emit electromagnetic radiation spanning desired wavelength ranges, intensities, and polarities, among other things. For example, in one embodiment, bi-sensing optical system may comprise two emitters (not shown), such as, for example, an emitter configured to emit visible light, such as an LED, among other things, and an emitter configured to emit IR light. Thus, the present disclosure contemplates any suitable number and type of emitter 106 in order to emit electromagnetic radiation spanning desired wavelengths, intensities, and polarities, among other things.

Further, sensor 104 may comprise any suitable type or form of sensor configured to receive and/or capture electromagnetic radiation from the transmission path. For instance, in one embodiment sensor 104 may comprise one or more cells configured to capture different wavelengths of IR light, among other things. In one embodiment, sensor 104 may comprise one or more charge-coupled devices (CCDs), CMOS imagers, just to provide a couple of examples.

In operation, processor 102 may receive one or more signals. The received signals may comprise non-transitory computer readable instructions, by way of example. In one case, a plurality of signals may be received, the plurality of signals comprising non-transitory computer readable instructions capable of enabling, for example, a user interface, a graphical overlay, an object detection pattern, and/or an eye tracking pattern, among other things. Processor 102 may process the received signals and transmit resultant signals to emitter 106 and/or sensor 104. Emitter 106 may receive the resultant signals from processor 102 and may emit electromagnetic radiation along an optical transmission path. For instance, in one embodiment, emitter 106 may be configured to convert and/or transform the resultant signals into electromagnetic radiation comprising visible and IR light, for example. In one case, the resultant signals that emitter 106 receives from processor 102 may comprise signals capable of enabling a graphical overlay, eye tracking, and object detection/tracking, among other things. In this case, emitter 106 may emit electromagnetic radiation comprising visible light of a first wavelength range to enable the graphical overlay, IR light of a second wavelength range to enable eye tracking, and IR light of a third wavelength range to enable object detection/tracking. In another embodiment, emitter 106 may transmit electromagnetic radiation spanning a range of wavelength corresponding to visible light, and electromagnetic radiation spanning a range of wavelength corresponding to non-visible light. In this case, the transmitted electromagnetic radiation spanning a range of wavelength corresponding to visible light may enable a graphical overlay. Also, the transmitted electromagnetic radiation spanning a range of wavelength corresponding to non-visible light may be further subdivided by, wavelength, polarity, intensity, and/or a time sequence, among other things. For instance, electromagnetic radiation of a wavelength corresponding to non-visible light and capable of enabling eye tracking may be isolated to a given sub portion of the range of wavelength corresponding to non-visible light, may be assigned a given polarity state, a given intensity, and/or a given time sequence. Additionally, electromagnetic radiation corresponding to non-visible light and capable of enabling object tracking/detection may be isolated to a given sub portion of the range of wavelength corresponding to non-visible light, may be assigned a given polarity state, a given intensity, and/or a given time sequence to facilitate splitting and/or dividing electromagnetic radiation for eye tracking from electromagnetic radiation for object tracking/detection.

In operation, electromagnetic radiation comprising wavelengths spanning wavelengths corresponding to visible light and electromagnetic radiation comprising wavelengths corresponding to non-visible light (e.g., IR light) may all traverse the transmission path in an integrated manner. Thus, electromagnetic radiation comprising visible light and non-visible light may travel along the transmission path in common. Thus, for example, visible light comprising an image to be emitted to eye 108 may be transmitted along transmission path with IR light capable of enabling eye tracking and object 110 tracking/detection. The transmitted IR light may reflect back off eye 108 and object 110, traverse the transmission path, and be sensed and/or received by sensor 104. In one embodiment, sensor 104 may be configured to convert and/or transform the received light to electrical signals that are transmitted to processor 102 for processing, among other things.

Figure 2:
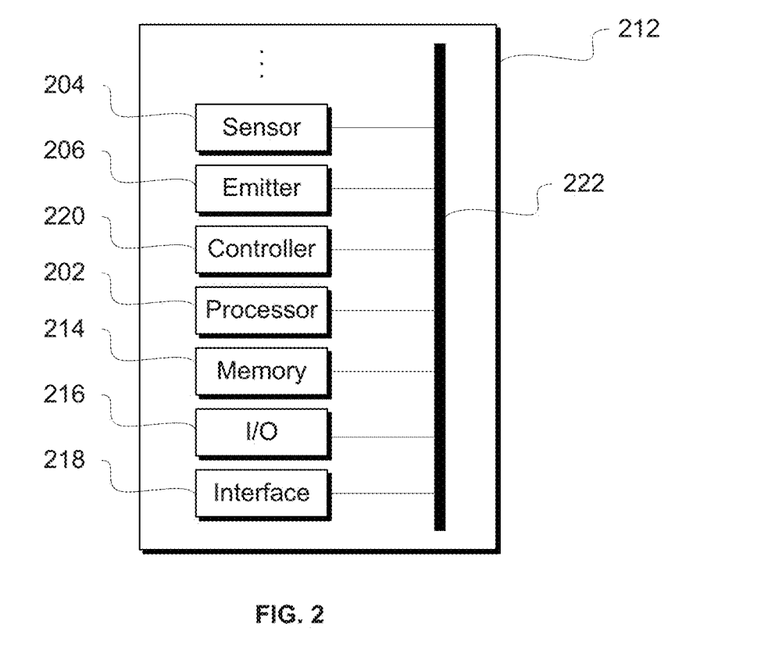
FIG. 2 is a block diagram illustrating a bi-sensing optical device according to one embodiment.

FIG. 2 is a block diagram showing elements and components of bi-sensing optical device 212. In one embodiment, bi-sensing optical device 212 may comprise a HMD. As discussed in relation to FIG. 1, bi-sensing optical device 212 may comprise a processor 202, a sensor 204, and an emitter 206. Bi-sensing optical device 212 may also comprise other elements and components including, among other things, a memory 214, an I/O module 216, an interface 218, and a controller 220, among other things. Processor 202, sensor 204, emitter 206, memory 214, I/O module 216, interface 218, and controller 220 may all be connected via a bus 222.

Processor 202 may comprise any suitable processing module and may be any combination of hardware and/or software configured to process signals. Processor may be independent of controller 220, may be a subpart of controller 220, or controller 220 may be a part of processor 202. Processor 202 may receive signals from and transmit signals to other components and elements of bi-sensing optical device 212 in the form of non-transitory computer readable instructions. In one embodiment, the received/transmitted signals may comprise electrical signals, optical signals, and electromagnetic radiation, among other things.

Memory 214 may comprise any suitable form of memory including, for example, short-term and long-term memory modules. In one embodiment, memory 214 may comprise RAM. In another embodiment, memory 214 may comprise a hard drive with magnetic disks or plates. Memory 214 may also comprise resistive memory, flash memory, or any other suitable form of memory and may be configured to store bits comprising, for example, non-transitory computer readable instructions and data, among other things. Of course, memory 214 may comprise any suitable form of memory capable to storing data.

I/O 216 may comprise any suitable module capable of enabling input/output of bi-sensing optical device 212. For instance, I/O 216 may comprise a combination of hardware and/or software and facilitate functionality relating to the input and output functionality of bi-sensing optical device 212. In one case, I/O 216 may comprise a module configured to facilitate communication such as, for example, an exchange of signals, with a variety of I/O components and elements such as, for example, a camera, a display, a speaker, a microphone, or a touchpad, among other things.

Interface 218 may comprise any suitable module relating to an interface with users, devices, and/or other modules of bi-sensing optical device 212. For instance, interface 218 may comprise a combination of hardware and/or software capable of facilitating an interface to allow interaction with a user. In one embodiment, interface 218 may transmit and receive data comprising and/or configured to enable a graphical user interface with which a user may interact. In another embodiment, interface 218 may facilitate communication with a device external to bi-sensing optical device 212. For instance, interface 218 may transmit and/or receive communications from a device external to bi-sensing optical device 212.

Controller 220 may comprise hardware, software, and any suitable combination thereof. Controller 220 may comprise a module capable of altering characteristics of signals including, but not limited to, electromagnetic radiation comprising wavelengths spanning ranges of visible light and/or IR light, among other things. As was discussed above in relation to processor 202, controller 220 may work independently of processor 202, or may work in conjunction therewith. For instance, in one embodiment, controller 220 may be capable of working in conjunction with processor 202, sensor 204, and emitter 206 for eye tracking and object detection/tracking, among other things. Controller 220 may also be capable of controlling or managing the signals enabling the transmission of a graphical overlay to a user's eye, among other things. For instance, controller 200 may be capable of tracking the position of an eye and/or detecting/tracking an object (e.g., a user's hand or finger) and adjusting the electromagnetic radiation transmitted to the user in conjunction wherewith. Of course, the preceding and other functionality contemplated for controller 220 may be performed by any element or part, and controller 220 may be considered more generally as a symbolic representation of hardware and software configured to contribute to the operation of bi-sensing optical device 212.

Bus 222 may be capable of transmitting and receiving data to and from sensor 204, emitter 206, controller 220, processor 202, memory 214, I/O 216, and interface 218, among other things, and also to devices and modules external to bi-sensing optical device 212.

In operation, one or more signals may be transmitted along bus 222. For instance, one or more signals for enabling a user interface, eye tracking, and/or object detection/tracking may be transmitted along bus 222. For example, signals comprising non-transitory computer readable instructions may be transmitted from memory 214 along bus 222 to processor 202, where the instructions may be implemented. In response, signals may be transmitted via bus 222 to controller 220 for, among other things, the control and function of bi-sensing optical device 212. Signals may be transmitted via bus 222 to I/O 216 for, among other things, input/output of bi-sensing optical device 212. For example, one or more signals may be transmitted to a camera module or wireless transceiver of bi-sensing optical device 212, among other things. Signals may also be transmitted via bus 222 to interface 218 for, among other things, user interface operation or functionality.

In one embodiment, one or more signals may be transmitted from processor 202 to emitter 206. Emitter 206 may comprise hardware and/or software configured to transmit electromagnetic radiation along an optical transmission path, such as the optical transmission path in FIG. 1, to a user's eye for display of an image overlay and/or eye tracking, and also to another area for object detection/tracking. Electromagnetic radiation may be reflected back from the user's eye and from the object (e.g., a hand or finger) and may be transmitted via the transmission path where it may be received by sensor 204. Sensor 204 may capture the received electromagnetic radiation, which may comprise, among other things, one or more images of the user's eye to facilitate eye tracking, one or more images of an object, such as, for example, the user's hand to facilitate object detection/tracking. The captured electromagnetic radiation may be transformed or otherwise converted into signals and transmitted, via bus 222, to processor 202 for processing.

Figure 3:
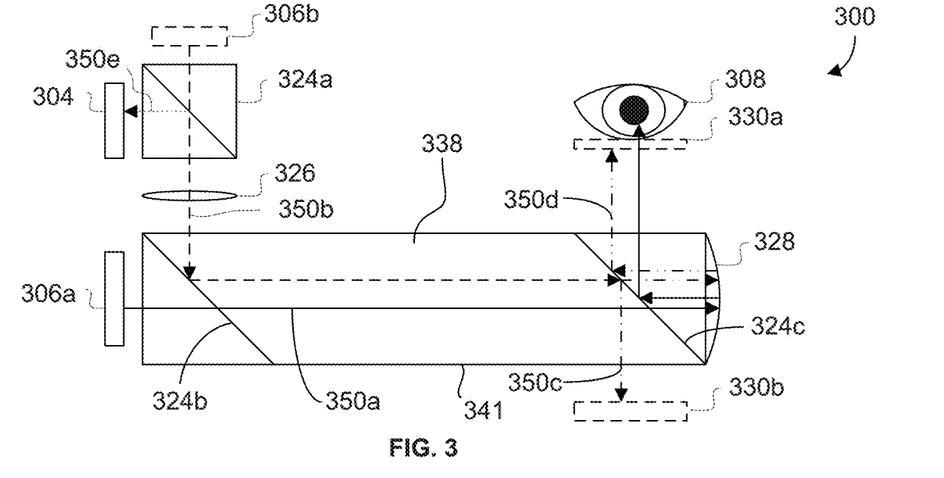
FIG. 3 illustrates elements of a bi-sensing optical system according to one embodiment.

FIG. 3 illustrates a bi-sensing optical system 300 according to another embodiment. In one embodiment, bi-sensing optical system 300 may comprise one or more emitters 306*a* and 306*b*. For example, emitter 306*a* may be capable of emitting electromagnetic radiation 350*a* comprising a first range of wavelengths, which may comprise, among other things, visible light. Electromagnetic radiation 350*a* may enter an optical part 338, may travel through a first beam splitter 324*b*, a second beam splitter 324*c*, may reflect off a reflector 328, may be diverted by second beam splitter 324, and may be therefore directed toward eye 308. As used herein, an optical part, such as optical part 338, may comprise any material suitable for the propagation of electromagnetic radiation, including, but not limited to, glass, plastic, or even air. In one embodiment, optical part 338 may comprise one or more surfaces, such as surface 341. In at least one case, surface 341 may comprise a coating capable of allowing certain wavelengths of electromagnetic radiation to pass through while reflecting other wavelengths of electromagnetic radiation. As used herein, a beam splitter may comprise any device capable of splitting or dividing electromagnetic radiation into portions and/or redirecting electromagnetic radiation. In an embodiment where electromagnetic radiation 350*a* may comprise visible light, eye 308 may receive electromagnetic radiation 350*a* and may allow the user to view a graphical overlay or other visible light, among other things.

Emitter 306*b* may be capable of emitting electromagnetic radiation 350*b* comprising a second range of wavelengths, which may comprise, among other things, IR light. For the reader's reference, emitter 306*b*, electromagnetic radiation 350*b*, 350*c*, 350*d*, and 350*e*, and deflection patterns 330*a* and 330*b* are depicted with broken lines in FIG. 3 to indicate an association with IR light and distinguish them from similar drawing elements for visible light. Electromagnetic radiation 350*b* may travel through an IR beam splitter 324*a* and a lens element 326 and may be diverted by first beam splitter 324*b*. Second beam splitter 324*c* may split electromagnetic radiation 350*b* into a first portion 350*c* and a second portion 350*d*. Second beam splitter 324*c* may divert first portion 350*c* of electromagnetic radiation 350*b* toward a given area and may comprise a detection pattern 330*b*. In one embodiment, detection pattern 330*b* may be such as to enable the detection and/or tracking of an object such as, for example, a finger or a hand of a user, among other things. Second beam splitter 324c may allow second portion 350d of electromagnetic radiation 350b to traverse it and reflect off reflector 328 after which second beam splitter 324c may deflect second portion 350d toward eye 308 to enable a detection pattern 330a. In one embodiment, detection pattern 330a may be such as to enable the tracking of eye 308.

Light from detection patterns 330a and 330b may be reflected back, via second beam splitter 324c, first beam splitter 324b, lens element 326, and IR beam splitter 324a toward sensor 304. The light reflected back from detection patterns 330a and 330b may be represented by electromagnetic radiation 350e which may comprise electromagnetic radiation reflected from eye 308 or an object and comprising electromagnetic radiation 350b, first portion 350c, and/or second portion 350d. Notably, bi-sensing optical system 300 may enable an integrated optical system capable of transmitting electromagnetic radiation for eye tracking and object detection/tracking along the same transmission path, and also along the same transmission path as electromagnetic radiation comprising visible light.

In operation, electromagnetic radiation 350a comprising visible light comprising a graphic overlay or graphic display and may be transmitted by emitter 306a. Electromagnetic radiation 350a may be combined with electromagnetic radiation 350b along a same transmission path, which may, in at least one case, run along at least a portion of a length of optical part 338. In one embodiment, a coating on one or more surfaces of optical part 338, such as surface 341, may facilitate the transmission and/or reflection of electromagnetic radiation as shall be shown hereafter. Electromagnetic radiation 350a may traverse a first beam splitter 324b and a second beam splitter 324c. Electromagnetic radiation 350a may be directed, via reflector 328 and second beam splitter 324c toward eye 308, where electromagnetic radiation 350a may impact the retina (not shown) and be viewed as a graphic overlay and/or graphic display by the user. Meanwhile, electromagnetic radiation 350b may comprise IR light, may traverse IR beam splitter 324a, lens element 326, and may be deflected by first beam splitter 324b. Electromagnetic radiation 350b may thus be combined with electromagnetic radiation 350a. Electromagnetic radiation 350b may be split into two portions, a first portion 350c and a second portion 350d by second beam splitter 324c. In one embodiment, a coating on one or more surfaces of optical part 338, such as surface 341, may facilitate the transmission of second portion 350d toward eye 308. The coating may also be selected to reduce the transmission of electromagnetic radiation outside of the wavelength of second portion 350d. First portion 350c of electromagnetic radiation 350b may be transmitted toward an area to enable object detection and/or tracking. In one example, first portion 350c may be transmitted into an area in front of a user's field of vision to as to detect a user's hand and to track movement thereof. For instance, electromagnetic radiation 350a may correspond to a graphical overlay comprising "YES" and "NO" buttons reflected into eye 308. In conjunction with this visible light, the user may be able to move his or her hand towards the area where the user perceives the "YES" and "NO" buttons and may therefore attempt to interact with them. In this example, first portion 350c of electromagnetic radiation 350b may comprise a detection pattern 330b configured to detect and/or track the user's hand. Electromagnetic radiation of first portion 350c may be reflected back, via second, first, and IR beam splitters 324c, 324b, and 324a, respectively, and to sensor 304 to register movement of the user's hand, among other things.

In one embodiment, second portion 350d of electromagnetic radiation 350b may be directed toward eye 308 and may enable eye tracking functionality, among other things. For instance, second portion 350d may enable a detection pattern 330a configured to track movement of eye 308. By way of example, bi-sensing optical system 300 may be configured to use eye tracking to enhance functionality. Eye tracking may be used, for instance, to assist bi-sensing optical system 300 to determine where a user might be focusing his or her attention relative to a potential field of vision, among other things. Light may be reflected back from eye 308, may comprise at least a part of second portion 350d, and may be directed via the transmission path to sensor 304. The coating on one or more surfaces of optical part 338, such as surface 341, may, as discussed above, be capable of reducing electromagnetic radiation from outside of the wavelength of second portion 350d, which may, in at least one embodiment, increase a signal to noise ratio of bi-sensing optical system 300. The foregoing description of function and structure of bi-sensing optical system 300 is offered for illustrative purposes only. It should not be taken in a restrictive sense. Further, the present disclosure encompasses many other structures and principles of operation consistent with the concepts and principles disclosed herein.

Figure 4:
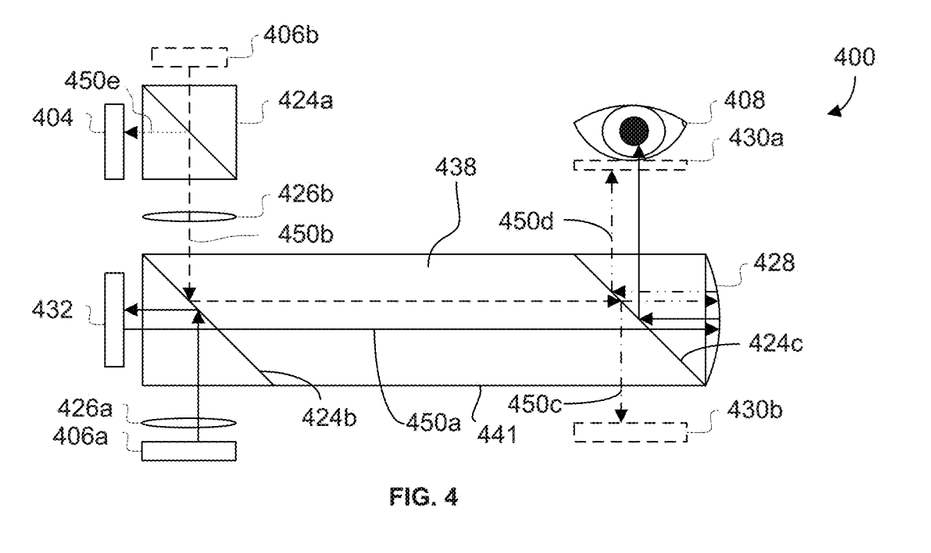
FIG. 4 illustrates elements of a bi-sensing optical system according to another embodiment.

FIG. 4 is a diagram of a bi-sensing optical system 400 according to one embodiment. As would be readily apparent to one of ordinary skill in the art, bi-sensing optical system 400 is similar, though not exactly the same as, bi-sensing optical system 300 shown in FIG. 3 and discussed above. Thus, much of the foregoing discussion may be relevant to the discussion of bi-sensing optical system 400.

Bi-sensing optical system 400 may comprise one or more emitters, such as, for example, emitter 406a and emitter 406b. Emitter 406b may be configured to emit electromagnetic radiation 450b spanning wavelengths of IR light and which may traverse an optical element such as lens element 426b. For example, electromagnetic radiation 450b may comprise IR light. Of course, other wavelength ranges of electromagnetic radiation may be used as well. And similar to the preceding discussion of FIG. 3, broken lines are used for the reader's convenience to highlight IR light and IR light elements. Emitter 406a may be configured to emit electromagnetic radiation 450a spanning wavelength of visible light. Electromagnetic radiation 450a may traverse a lens element 426a in one example. In one embodiment, electromagnetic radiation 450a may be directed by first beam splitter 424b off of reflective display 432 and through first beam splitter 424b towards second beam splitter 424c. Electromagnetic radiation 450a may propagate along at least a portion of a length of an optical part 438. In one embodiment, optical part 438 may comprise one or more surfaces, such as surface 441. Electromagnetic radiation 450a and 450b may be combined along a transmission path and may be directed to an eye 408, a detection pattern 430a for eye tracking, and a detection pattern 430b for object detection/tracking. Bi-sensing optical system 400 may also be configured to such that electromagnetic radiation may be reflected back from detection patterns 430a and 430b, along the same transmission path, towards sensor 404. IR beam splitter 424a, first beam splitter 424b, second beam splitter 424c, and reflector 428 may be arranged and configured to combine, split, and/or direct electromagnetic radiation comprising, for example electromagnetic radiation 450a and 450b. For example, in one embodiment, IR beam splitter 424a may be configured to allow electromagnetic radiation of given wavelengths to pass through, but to redirect electromagnetic radiation 450e comprising reflected electromagnetic radiation from electromagnetic radiation 450b toward sensor 404. First beam splitter 424b may be arranged and configured to enable the combination of electromagnetic radiation 450a and 450b. First beam splitter 424b may also be configured to deflect electromagnetic radiation 450b and 450e, among other things. Second beam splitter 424c may be arranged and configured to split electromagnetic radiation 450b into a first portion 450c and a second portion 450d. Second beam splitter 424c may direct first portion 450c to enable a detection pattern 430b, and may also direct second portion 450d to enable a detection pattern 430a. Reflector 428 may reflect electromagnetic radiation 450a and second part 450d of electromagnetic radiation 450b back off of second beam splitter 424c and on towards eye 408. Of course, second beam splitter 424c and reflector 428 may also be arranged and configured to combine and direct electromagnetic radiation reflected back from detection pattern 430a and 430b (e.g., electromagnetic radiation 450e) towards first beam splitter 424b, IR beam splitter 424a, and on to sensor 404. In one embodiment, a coating on one or more surfaces of optical part 438, such as surface 441, may, as discussed above, be capable of reducing electromagnetic radiation from outside of the wavelength of second portion 450d, which may, in at least one embodiment, increase a signal to noise ratio of bi-sensing optical system 400.

In operation, bi-sensing optical system 400 may function similar to as was discussed above in relation to bi-sensing optical system 300. For example, electromagnetic radiation 450a and 450b may be transmitted from emitters 406a and 406b and may be combined, directed, and/or split on its way towards an eye 408 and an object (not shown). Electromagnetic radiation, such as electromagnetic radiation 450b, may be configured to provide a detection pattern 430a for eye tracking, and a detection pattern 430b for object detection/tracking. Electromagnetic radiation 450e may be reflected back to sensor 404, which may be configured to convert and/or transform the received electromagnetic radiation 450e into signals for processing, among other things. The foregoing is intended to be illustrative of structure and functionality and is not intended to be taken in a restrictive sense. One of ordinary skill in the art would understand that the principles discussed herein contemplate structure and/or function not directly discussed in relation to the preceding example embodiments.

Figure 5:
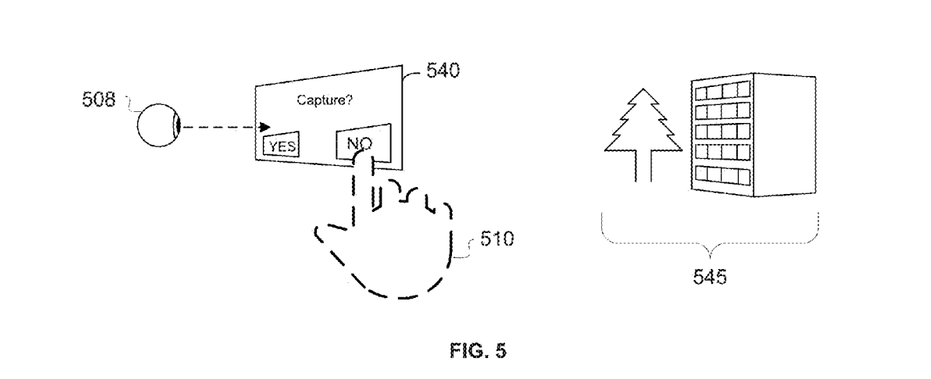
FIG. 5 illustrates exemplary functionality of a bi-sensing optical system according to one embodiment.

FIG. 5 illustrates possible function of a bi-sensing optical display system such as those discussed above. For example, visible light may be received by an eye 508 of a user. Display overlay 540 is intended to illustrate a graphic overlay that a user might perceive as enabled by the received visible light. Of course, the present disclosure not only contemplates graphic overlays such as overlay 540, but also contemplates non-see-through HMD systems where the user may not be able to see his or her surroundings. Returning to the example illustrated by FIG. 5, a user's surroundings may comprise, among other things, a scene 545 including structures, like buildings and trees, among other things. The user may still be able to see scene 545 if visible light of display overlay 540 is received by eye 508. For example, in one case, display overlay 540 may prompt the user to capture an image of scene 545 and may prompt the user to confirm the image capture. Of course, the image capture may be performed by physical manipulation of the bi-sensing optical system, such as, for example, touching a portion of the HMD. However, the present disclosure also contemplates detecting and/or tracking objects such as, for example, a user's hand 510. In this example, the user may be able to move hand 510 to an area in relation to the user where a given button or interactive element of display overlay 540 appears in the user's field of vision.

Thus, the user may have the impression that a button or other interactive element is floating in his or her field of view and that by moving a hand, such as hand 510, towards the button, the user may be able to interact therewith (e.g., touch the button or interactive element).

Further, eye tracking functionality of the bi-sensing optical system may enable tracking of eye 508 as the user moves it. Eye tracking functionality may be used in a variety of ways to provide functionality to an HMD. For example, if a given HMD comprises a bi-sensing optical structure consistent with the foregoing, the HMD may be configured to use eye tracking and object detection/tracking to enable functionality of the HMD. In one embodiment, eye tracking may be used in conjunction with a camera of the HMD to determine the focus of eye 508. Thus, for example, in a military context, the eye tracking functionality of the HMD may enable a zoomed display to be provided to the user. In this example, a soldier may be able to move his or her focus over his or her surroundings while the HMD and an associated camera provides a zoomed view of focused areas. The user may also be able to interact with the HMD, such as increasing or decreasing zoom, among other things, using his or her hand. Related functionality may allow night vision and/or heat-detection-related functionality to be provided to a user via an HMD. In a consumer context, an HMD coupled with a bi-sensing optical system may allow a user to move his or her focus to different objects in his or her field of view and receive real-time feedback from the HMD regarding the objects, and may also enable interaction with display overlays, such as display overlay 540. For example, the present disclosure contemplates an HMD with a bi-sensing optical system that might allow a tourist to focus on a distant landmark and, with a simple movement of a finger, receive real-time information for the landmark including, among other things, step-by-step directions to reach the landmark. A detailed discussion of possible eye tracking functionality and uses is not given herein. Nevertheless, one of ordinary skill in the art would appreciate the possible functionality and uses that may be enabled by the above discussion and the following further examples.

Figure 6:
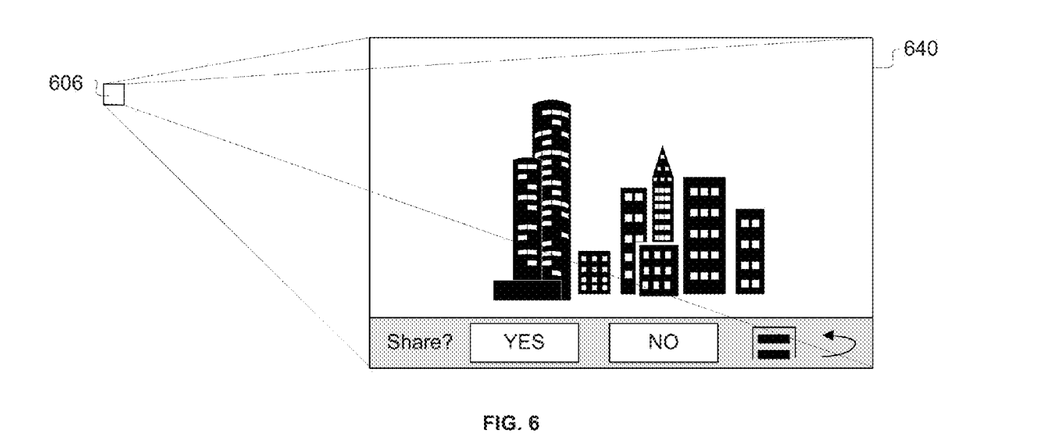
FIG. 6 illustrates exemplary functionality of a bi-sensing optical system according to one embodiment.

FIG. 6 illustrates how a user employing an HMD comprising a bi-sensing optical system as disclosed herein might perceive a display overlay 640 in relation to objects in the user's field of view. In this example, an emitter 606 may emit electromagnetic radiation comprising visible light. The emitted visible light may be received by the eye of the user and may give the user the impression that a graphical display is arranged within the user's field of sight. Unseen by the user, however, the emitter 606 (or other emitter of the bi-sensing optical system) may also be configured to emit non-visible electromagnetic radiation, such as, for example IR light. The HMD may be configured to use emitted IR light to sense eye movement, to detect and/or track an object, among other things. For example, if the user is viewing a city skyline as illustrated in FIG. 6, display overlay 640 may be configured to frame a given portion of the user's field of view as shown. Display overlay 640 may comprise dot matrix or some other suitable form of low resolution that may facilitate low power consumption, in one embodiment.

The visible light received by the user's eye and thus visible to the user may comprise any number of forms and may be opaque or partially transparent, among other things. For instance, in one embodiment, an HMD comprising a bi-sensing optical system contemplated by the present disclosure may comprise a minimal graphical display. In this example, the HMD may be configured to not display anything, or to only display discreet icons that may remain partially hidden until the user requests a full display. For example, in one embodiment, an HMD comprising a bi-sensing optical system may display minimal information including, for example, an icon indicating a battery level and/or one or more notification icons. However, if the user desires to find out more information the user may be able to move his or her hand towards a given area relative to the user's field of sight. The movement of the user's hand may be detected by reflected IR light in one embodiment. Thus, the HMD may be configured to detect or track the user's hand and interpret the movement to provide, for example, additional information to the graphical display for the battery level and/or the one or more notification icons, for example. In one case, the user may receive a notification for the reception of a message, and the user may be able to interact with the notification icon to access further information. Of course, consistent with the principles disclosed herein, one of ordinary skill in the art would understand that the user may also be able to merely move his or her eye towards the notification icon, and the HMD may be able to track said eye movement and, in response, provide additional information. Eye tracking may be enabled by receiving reflected IR light from the user's eye, for example. Of course, the foregoing is presented merely as an illustrative example of structure and/or functionality consistent with the principles of the present disclosure. As one of ordinary skill in the art would understand, the principles of the present disclosure as relating to a bi-sensing optical system may enable any number of potential structures and/or functions.

Figure 7:
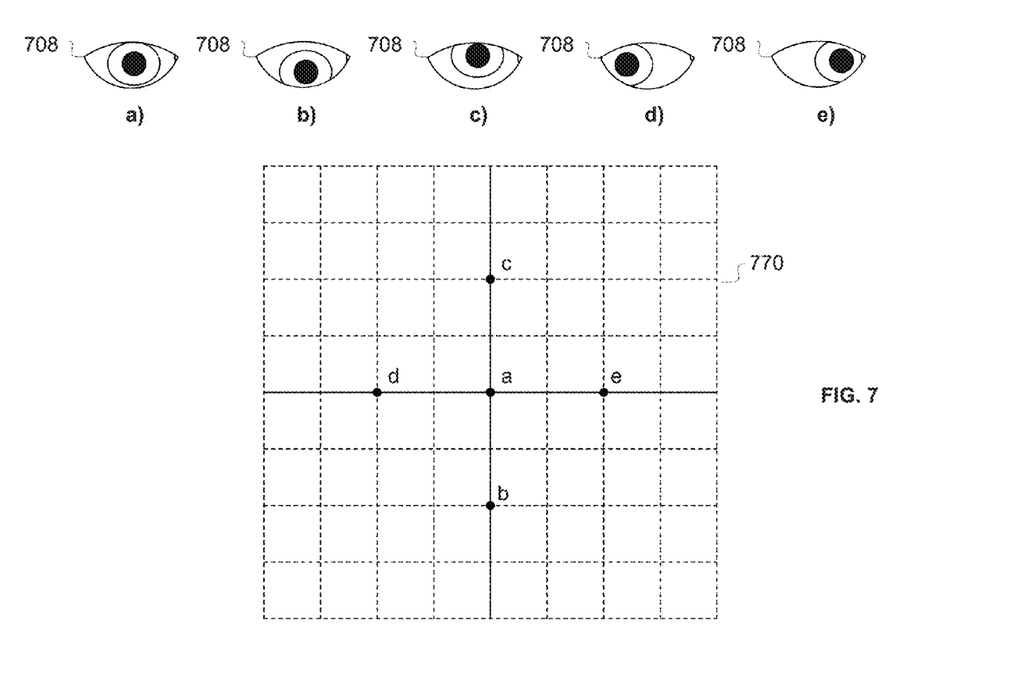
FIG. 7 illustrates exemplary eye tracking functionality of a bi-sensing optical system according to one embodiment.

FIG. 7 illustrates general principles of operation of eye tracking according to one embodiment of a bi-sensing optical system. Such principles of operation may be enabled by a bi-sensing optical system configured to enable the transmission of electromagnetic radiation spanning two or more wavelength ranges. For example, the bi-sensing optical system may emit electromagnetic radiation comprising visible light and IR light, among other things. The emitted electromagnetic radiation may traverse a common transmission path and may propagate, may be combined, divided, and directed to a variety of possible desired destinations including, but not limited to, a user's eye and a region wherein object detection, such as hand movement, may be detected. The bi-sensing optical system of one embodiment may be configured to transmit non-visible light, such as, for example, IR light, toward a user's eye. The transmitted light may reflect back off of the user's eye, traverse the common or integrated transmission path of the bi-sensing optical system, and be received by a sensor, as described above. The received signals may enable a device, such as an HMD, to determine an orientation of the iris of a user's eye, and may therefore track movement of the eye. Of course, this is by one example of eye tracking. Other methodologies are also contemplated by the present disclosure including, for example, tracking of corneal reflection such as dual Purkinje tracking, and tracking based on features within the eye such as blood vessels.

Once an orientation of the eye is determined, the device comprising the bi-sensing optical system may enable a correlation of eye orientation to a given field of view. FIG. 7 comprises a grid to illustrate exemplary correlation. For example, eye 708 in position 'a' may correspond to a central position, as shown by the point 'a' in the center of the grid. Eye 708 in orientation 'b' may correspond to a position slightly below the central position of 708(*a*). Eye 708 in orientation 'c' may correspond to a position slightly above the central position, as shown by the point 'c' slightly above point 'a'. Eye 708 in orientation 'd' may correspond to a position slightly to the left of the central position, as shown by the point 'd'. Eye 708 in orientation 'e' may correspond to a position slightly to the right of the central position, as shown by the point 'e'. The grid in this exemplary system comprises 81 points of intersection, and thus suggests that 81 possible eye orientations may be possible. As would be readily understood by one of ordinary skill in the art, any level of sensitivity is contemplated by the present disclosure and may be enabled by the bi-sensing optical system disclosed herein comprising the transmission of electromagnetic radiation facilitating eye tracking and object tracking along a common or integrated transmission path.

Figure 8:
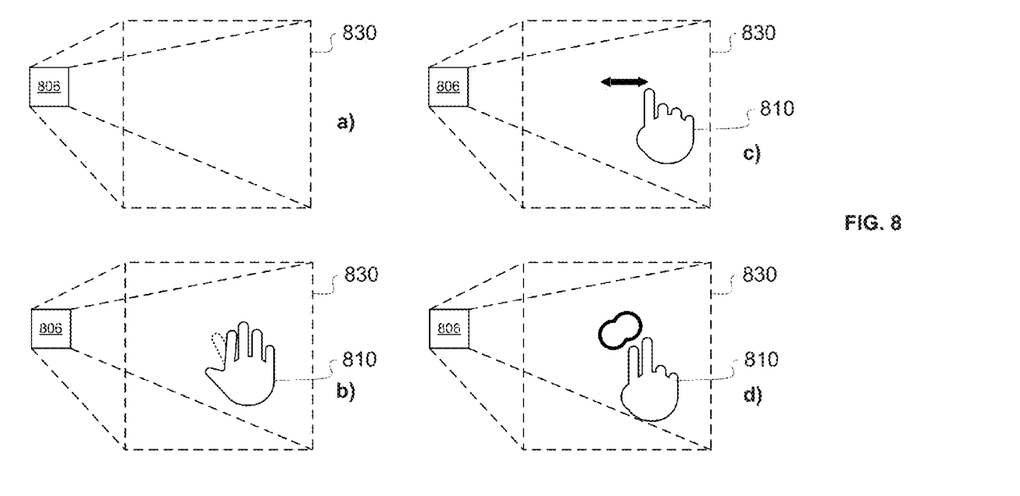
FIG. 8 illustrates exemplary object tracking functionality of a bi-sensing optical system according to one embodiment.

Related to the foregoing, FIG. 8 illustrates general principles of operation relative to object tracking and/or detection of an HMD device comprising a bi-sensing optical system. As illustrated, one or more emitters 806 may be configured to emit electromagnetic radiation comprising, among other things, visible and non-visible light. In one embodiment, emitter 806 may be configured to emit IR light. The emitted IR light may be configured to provide an overlay or pattern 830. The pattern may not be visible to by the user's eye, but may comprise electromagnetic radiation that may be reflected back by an object within the pattern 830. FIG. 8(*a*) illustrates one embodiment where pattern 830 does not encounter an object. In this embodiment, IR light may not be reflected back through the transmission path and to the sensor. FIG. 8(*b*) illustrates an embodiment where an object 810 is arranged within pattern 830. In this case, object 810 comprises a hand. IR light may be reflected back from object 810 to provide one or more "images" thereof. For example, a device according the present disclosure may be configured to detect movement of a finger of the hand (e.g., object 810), as shown in FIG. 8(*b*). FIG. 8(*c*) illustrates that the present disclosure may contemplate functionality such as object tracking to detect movement of object 810. Such functionality may be useful for detecting, for example, scrolling and pinch-and-zoom, among other things. Other relevant functionality may enable isolating behavior of specific parts of object 810. For example, as shown in FIG. 8(*d*), an HMD according to the present disclosure may be configured to emit a pattern 830 capable of detecting multi-touch functionality, among other things, as illustrated by object 810 and the two touch points within pattern 830. Of course, the foregoing is but illustrative of possible functionality supported by a bi-sensing optical system.

Figures 9, 10, 11:
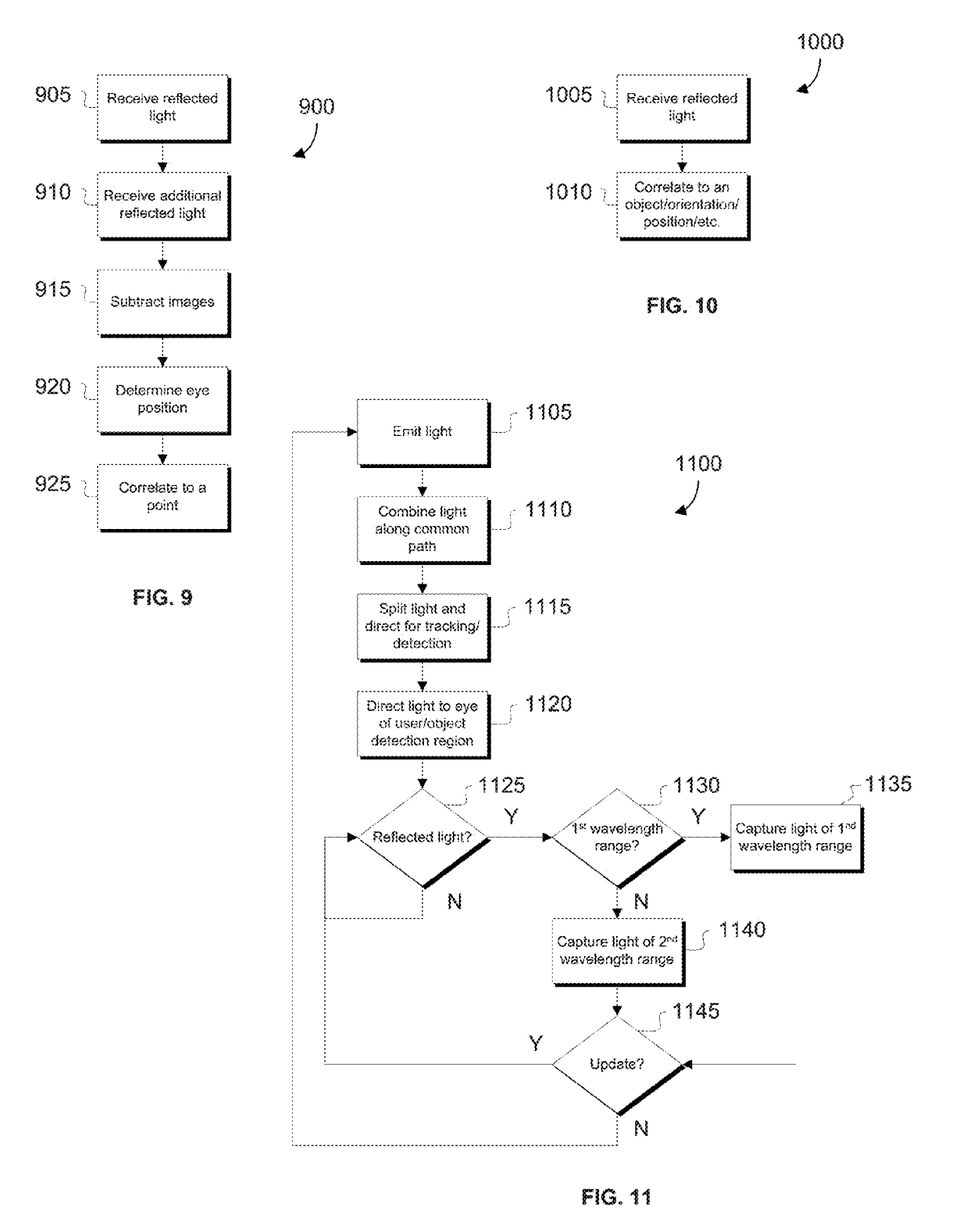
FIG. 9 illustrates an exemplary method of tracking eye movement according to one embodiment.
FIG. 10 illustrates an exemplary method of tracking object movement according to one embodiment.
FIG. 11 illustrates an exemplary method of functioning for a bi-sensing optical system according to one embodiment.

FIG. 9 illustrates a method 900 of tracking eye movement according to one embodiment. In method step 905 reflected light may be received by a sensor. For example, IR light transmitted and reflected back from an eye of a user may be received at the sensor. At method step 910, additional reflected light may be received by a sensor. The light received at steps 905 and 910 may comprise reflected IR light emitted from light sources at different orientations relative to the user's eye. For example, the light received in step 905 may comprise reflected IR light transmitted along an axis relative to the iris of the eye, while light received in step 910 may comprise reflected IR light transmitted from off of the axis. In this example, the received light may lead to an image comprising a bright iris and an image comprising a dark iris. The images may be subtracted to receive an image suitable for eye tracking, in method step 915. In another embodiment, a variety of manipulations including, but not limited to, noise removal, image sharpening, and center point detection, may be performed on the received light in order to arrive at an image suitable for eye tracking.

In method step 920, once a suitable image for eye tracking has been arrived at, an eye position may be determined. And as was discussed above, once the eye position is determined, the position is correlated and/or mapped to a point. For example, if the user is focusing directly on a tree in her field of view, the eye tracking system of the HMD may determine the orientation of the eye, as described above, may map the eye to the user's field of view, also as described above. In one example, the HMD may thereafter determine that the user is focusing on the tree. In any case, subsequent function of the HMD functionality and operation may be in some way related to the determined eye orientation and correlation/mapping to a point.

FIG. 10 illustrates a method 1000 for object detection and/or tracking. The illustration of method 1000 is but a simple illustrative method according to one embodiment. As would be readily understood by one of ordinary skill in the art, the present disclosure enables other methods and functionality. Similar to method 900, in step 1005, light may be received at a sensor of an HMD. For example, an emitter of the HMD may emit electromagnetic radiation comprising IR light. The emitted IR light may be configured to form a pattern. The light of the formed pattern may be reflected back to a sensor of the HMD by an object that enters therein and may therefore be received by the sensor.

In a step 1010, the received light may be correlated to an object, to an orientation thereof, to a position thereof, etc. For instance, the received light may be correlated to a given object, such as a hand or a pointer, among other things. The received light may be correlated to an orientation of the object as well. For example, it may be determined that the fingers of the hand may be pointing up, may be pointing down, and/or may be pointing to one side or the other, among other things. Related to the foregoing, a position of the object may also be determined. For instance, in one example embodiment, it may be determined that the object is at a first position relative a graphical overlay.

FIG. 11 illustrates a method 1100 that pulls together eye tracking and object detection and/or tracking relative to a bi-sensing optical system. In a first method step 1105, electromagnetic radiation comprising light is emitted. The emitted light may originate from one or more separate emitters or light sources and may comprise visible and non-visible light. The non-visible light may comprise IR light, for example. In an embodiment, the visible light and the IR light may be combined along a common or integrated transmission path in a step 1110. For example, a material such as glass, plastic, or air, among other things, may be configured to enable the transmission of visible and IR light along a common or integrated transmission path.

In a method step 1115, the combined light may be split and directed to different destinations. For example, the IR portion of the combined light may be divided into two portions. The first portion may be directed and configured to provide a pattern for object detection and/or tracking. The second portion of IR light may be directed and configured to provide a pattern for eye tracking. In addition to the direction of IR light for eye tracking and object detection and/or tracking, the visible light may be directed to the eye of the user to display graphical information, among other things. The directing of light to the object and to the eye may comprise method step 1120.

In a method step 1125, the bi-sensing optical system may determine whether reflected light has been received. If not, then, in one embodiment, the system may loop back to method step 1125 until reflected light is detected. Upon detection of reflected light, in one embodiment, the wavelength range of the light may be determined. In this example, IR light of a first wavelength range may enable eye tracking while IR light of a second wavelength range may enable object detection and/or tracking. In this example, if it is determined in method step 1130 that the light is of the first wavelength range, then the light may be captured in a method step 1135. If the detected light is not of the first wavelength range, then in method step 1140, light of the second wavelength range may be captured. Of course, other implementations are contemplated by the present disclosure. For example, IR light for eye tracking may comprise a first intensity, while IR light for object detection and/or tracking may comprise a second intensity. In this case, similar steps to those described above may be followed to captured light. In another example, IR light for eye tracking may comprise a first polarity, while IR light for object detection and/or tracking may comprise a second polarity. In an alternative embodiment, the detection of light may alternate based on timing. For example, at a first time, light of a first wavelength range may be captured. At a second time, light of a second wavelength range may be captures. The process may be repeated as desired. Certainly, embodiments comprising multiple sensing cells configured to simultaneously capture reflected light are also contemplated by the present disclosure. Of course, the foregoing is provided for illustrative purposes and is not intended to limit possible implementations of the present disclosure.

In a method step 1145, the system may determine whether it is necessary to update the light being transmitted via the transmission path. For example, if it is determined that the user has acted so as to alter the reflection of IR light, then it may be desirable to re-run the IR detection routine. Thus, the method may proceed back to step 1125 and reflected light may be detected. However, if no update is desired, then the method may proceed back to step 1105. One of ordinary skill in the art would understand that the preceding methods may be combined to lead to desired operation. He or she would also understand that the foregoing methods represent but a few of possible methods of operation consistent with a bi-sensing optical system as disclosed herein. Indeed, any method of operation for a system capable of transmitting signals for eye tracking and object detection and/or tracking is contemplated by the present disclosure. Any method of operation for a system capable of transmitting signals comprising both visible light and non-visible light for object tracking and/or detection is also contemplated by the present disclosure.

One skilled in the art will recognize that a virtually unlimited number of variations to the above descriptions are possible, and that the examples and the accompanying figures are merely to illustrate one or more particular implementations for illustrative purposes. They are not therefore intended to be understood restrictively.

The terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An apparatus comprising:
   an integrated optical system for infrared (IR) and visible light comprising:
   a visible light source;
   a first beam splitter to combine visible light from the visible light source and IR light from an IR light source on a single transmission path;
   a second beam splitter to receive the visible and IR light transmitted from the single transmission path and to (a) divert the visible light and a first portion of the IR light in a first direction to an eye of a user, and (b) divert a second portion of the IR light in a second direction different from the first direction for object detection; and
   an IR sensor capable of sensing (a) a reflection of the first portion of the IR light from the eye, and (b) a reflection of the second portion of the IR light from the object.

2. The apparatus of claim 1 wherein the first portion of the IR light has a different (a) wavelength, (b) intensity, (c) polarization state, or (d) time sequence than the second portion of the IR light.

3. The apparatus of claim 1 wherein each of the first and second portions of the IR light form a detection pattern.

4. The apparatus of claim 3 wherein the detection pattern of the first portion of the IR light enables eye tracking.

5. The apparatus of claim 1 wherein the IR sensor is capable of capturing the reflection of the first portion of the IR light at a first time, and capturing the reflection of the second portion of the IR light at a second time.

6. The apparatus of claim 1 wherein the visible light directed to the eye comprises a graphical overlay.

7. The apparatus of claim 1 wherein the reflection of the first and second portions of the IR light propagate to the IR sensor via the single transmission path.

8. A method comprising:
   directing light of a first and a second wavelength range via at least a first beam splitter to an eye of a user, wherein the light of the first wavelength range comprises visible light and the light of the second wavelength range comprises IR light;
   directing light of a third wavelength range via the at least the first beam splitter for object detection and/or tracking, wherein the light of the third wavelength range comprises IR light;
   combining light of the first, the second, and the third wavelength ranges for transmission along an axis of a light transmission path;
   receiving, at a light sensor, light reflected from the object and the eye of the user;
   detecting an object based at least in part on the received light; and
   using a detection pattern from the light of the third wavelength range to enable an interaction with an interactive element in the light of the first wavelength range.

9. The method of claim 8 further comprising determining an eye orientation based at least in part on the received light.

10. The method of claim 9 further comprising correlating the eye orientation to a point relative to a field of view.

11. The method of claim 8 wherein the reception of reflected light comprises receiving reflected light based at least in part on the light of the second wavelength range at a first time, and receiving reflected light based at least in part on the light of the third wavelength range at a second time.

12. The method of claim 8 wherein directing the light of the second and third wavelength ranges comprises directing based on an intensity of the light of the second wavelength range relative to the light of the third wavelength range.

13. The method of claim 8 further comprising:
    determining an orientation of the iris of the eye of the user; and
    correlating the orientation of the iris to a field of view.

14. The method of claim 8 wherein the using the detection pattern comprises detecting and/or tracking an object in the detection pattern.

15. A device comprising:
    an integrated optical system for directing visible light from a visible light source and IR light from an IR light source, the integrated optical system comprising:
    an optical part comprising at least one surface having a coating, wherein the visible light and the IR light propagate along at least a portion of a length of the optical part;
    one or more beam splitters capable of receiving the visible light and the IR light propagating along a common transmission path, splitting the IR light into a first part and a second part, directing both the first part and the visible light to an eye of a user, and directing the second part for object detection and/or tracking; and
    a sensor capable of capturing the IR light reflected back from an object or the eye.

16. The device of claim 15 wherein the coating increases the signal to noise ratio of at least the first part of the IR light.

17. The device of claim 15 wherein the coating reduces transmission of IR light outside of the wavelength of the first part of the IR light to and from the eye of the user.

18. The device of claim 15 wherein the reflected IR light is based at least in part on the first and second parts of the IR light, and the sensor is capable of capturing the first part independently of the second part.

19. The device of claim 18 wherein the capture of the first and second parts is based at least in part on a time sequence.

20. The device of claim 15 wherein the first and second parts each enable a detection pattern.

* * * * *